(12) United States Patent
McKee et al.

(10) Patent No.: US 9,308,878 B2
(45) Date of Patent: Apr. 12, 2016

(54) POWER APPARATUS FOR A VEHICLE TURRET

(71) Applicant: Control Solutions LLC, Aurora, IL (US)

(72) Inventors: Michael McKee, Aurora, IL (US); John Hayden, Aurora, IL (US)

(73) Assignee: Control Solutions LLC, Aurora, IL (US)

( * ) Notice: Subject to any disclaimer, the term of this patent is extended or adjusted under 35 U.S.C. 154(b) by 409 days.

(21) Appl. No.: 13/828,696

(22) Filed: Mar. 14, 2013

(65) Prior Publication Data

US 2013/0328388 A1  Dec. 12, 2013

Related U.S. Application Data

(60) Provisional application No. 61/657,364, filed on Jun. 8, 2012.

(51) Int. Cl.
*B60R 16/03* (2006.01)
*B60R 16/027* (2006.01)
*H01H 9/10* (2006.01)

(52) U.S. Cl.
CPC ............... *B60R 16/03* (2013.01); *B60R 16/027* (2013.01)

(58) Field of Classification Search
CPC ........................................................ H01H 9/10
USPC ..................................... 307/48, 150
See application file for complete search history.

(56) References Cited

U.S. PATENT DOCUMENTS

2014/0183977 A1*  7/2014  Braunstein .................... 307/147

* cited by examiner

*Primary Examiner* — Robert Deberadinis
(74) *Attorney, Agent, or Firm* — McCracken & Gillen LLC

(57) ABSTRACT

An apparatus for providing power at a vehicle turret powered by a turret power source is provided. A power module is configured to be coupled to the turret power source such that the power module receives power from the turret power source. A coupling device is configured to couple the power module to the turret power source such that the power module receives the power from the turret power source via the coupling device. One or more power outlets are configured to provide power to an electronic device coupled to one of the power outlets. The power module and coupling device rotate in conjunction with the vehicle turret when the vehicle turret rotates.

24 Claims, 9 Drawing Sheets

POWER APPARATUS FOR A VEHICLE TURRET

CROSS-REFERENCE TO RELATED APPLICATION

This application claims priority of U.S. Provisional Patent Application No. 61/657,364 titled POWER APPARATUS FOR A VEHICLE TURRET, filed on Jun. 8, 2012, which is incorporated by reference in its entirety in this application.

FIELD OF THE INVENTION

This invention relates to apparatuses for providing power at vehicle turrets and, in particular, relates to apparatuses for powering electronic devices at vehicle turrets.

BACKGROUND

Armored vehicles may include a rotatable turret and a weapon mounted to the turret for use in military operations. To assist a turret operator in rotating the turret, a controlled turret drive system may be installed in the armored vehicle. The turret drive system may include a motor that drives rotation of the turret. The drive system may be configured to provide 360° of turret rotation independent of the vehicle body. The drive system may also include a turret power source that is independent of the vehicle power source and that provides the power to the motor when driving rotation of the vehicle turret.

In some situations, turret operators may desire to equip the vehicle turret with electronic accessory equipment such as, for example, lights, weapon sights, radios, fans, etc. Currently, however, turret operators have limited options to provide power to these electronic accessories. Typically, non-renewable energy sources are used.

Because the turret may rotate 360° independent of the vehicle body, any power cables that pass through the turret hatch into the vehicle body in order to access the vehicle power source can get wrapped up with the turret operator as the turret rotates. Moreover, the vehicle power source may be completely allocated to electronics within the vehicle cabin. As a result, the vehicle power source may not be available to provide power to additional electronic devices that were not part of the original power allocation scheme for the vehicle power source.

Additionally, some turret operators may presently attach the electronic accessory devices directly to the turret power source (e.g., turret batteries). This approach, however, can be hazardous as the power received from the turret power source is not properly regulated or protected in these situations. Furthermore, when electronic accessory devices are directly attached to the turret power source, the electronic accessory devices may quickly drain the turret power source or cause a misbalance in the power supply of the turret power source. Unbalancing the turret batteries may result in premature failure of the turret batteries. As a result, the turret power source may not be able to provide enough power to drive rotation of the turret when operating the turret drive system.

Therefore, a need exists for a new approach to providing power to electronic accessory devices at vehicle turrets.

SUMMARY

An apparatus for providing various power supply outputs at a vehicle turret powered by a turret power source is described. A power module is configured to be coupled to the turret power source such that the power module receives power from the turret power source. A coupling device is configured to couple the power module to the turret power source such that the power module receives the power from the turret power source via the coupling device. One or more power outlets are configured to provide power to an electronic device coupled to one of the power outlets. The power module and coupling device rotate in conjunction with the vehicle turret when the vehicle turret rotates.

BRIEF DESCRIPTION OF THE DRAWINGS

The invention will be described with reference to the following figures. The components in the figures are not necessarily to scale, emphasis instead being placed upon illustrating the principles of the invention. Moreover, like reference numerals in the figures designate corresponding parts throughout the different views.

DETAILED DESCRIPTION

A power apparatus for a vehicle turret and a method of providing power to electronic accessory devices at a vehicle turret is provided. The power apparatus couples to the turret power source, which may be independent of the vehicle power source or a subset of the vehicle power source. As a result, this reduces the chances of power cables becoming wrapped up with the operator as the turret rotates. Additionally, the power apparatus advantageously provides regulated and protected power to the electronic accessory devices. Furthermore, the power adapter may be mounted to the vehicle turret so that the power adapter advantageously moves in conjunction with the vehicle turret as the vehicle turret rotates.

Figure 1:
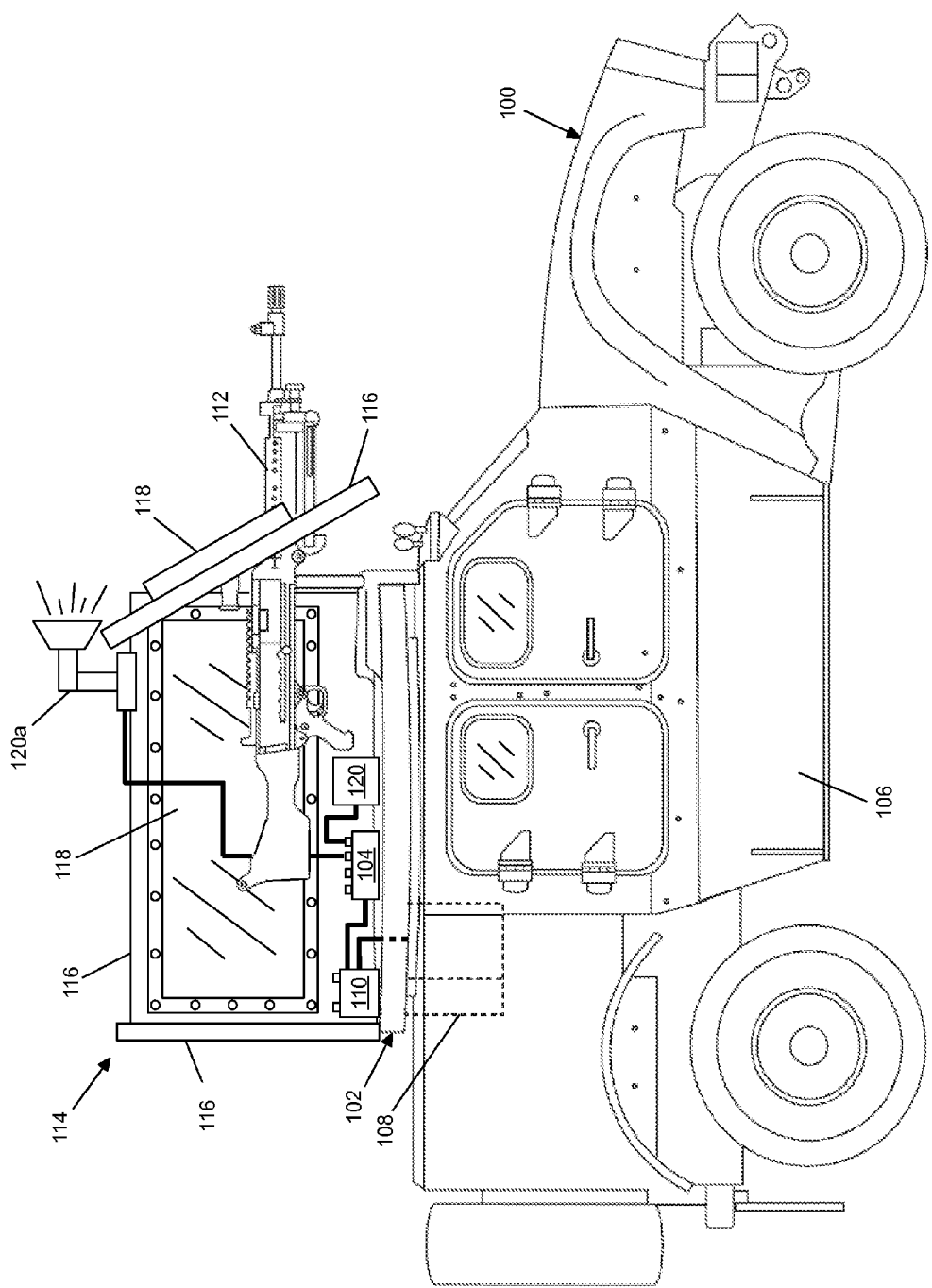
FIG. 1 is a right side view of an armored vehicle having a rotatable turret and an example of an implementation of a power apparatus.

Referring to FIG. 1, a right side view of an armored vehicle 100 having a rotatable turret 102 and an example of an implementation of a power apparatus 104. As discussed above, the turret 102 may rotate 360° independent of the vehicle body 106. A turret drive system 108 may assist a turret operator in rotating the turret 102. As discussed further below in FIG. 2, the turret drive system 108 may include a controller that controls a drive motor that drives rotation of the turret 102 in response to commands received at an input device such as e.g., a joystick (not shown). The turret drive system 108 may be coupled to and powered by a turret power source 110. The turret power source 110, in this example, is mounted to the vehicle turret 102 so that the turret power source moves in conjunction with the vehicle turret as the turret rotates. A weapon 112 may also be mounted to the vehicle turret 102 that moves in conjunction with the vehicle turret as the turret rotates. The vehicle turret 102 may also include a gunner protection kit (GPK) 114 to protect the turret operator during operation of the vehicle turret or the turret-mounted weapon 112. The GPK 114 may include armor 116 and transparent shielding 118 that surrounds the turret operator.

During operation of the turret 102, the turret operator may desire to use various electronic accessory devices 120 ("electronic devices"). Electronic accessory devices 102 may include, for example, speakers, cameras, weapon sights, lasers, gun safety releases, smoke grenade launchers, fans, electronic chargers, heads-up displays, sniper detectors, satellite communication (SATCOM) units, music players (e.g., iPods®), and the like. One type of electronic accessory device 120 that turret operators may wish use at the vehicle turret 102 is a turret spotlight 120a as shown by way of example in FIG. 1. Turret operators may mount the turret spotlight 120a to the armor 116 or transparent shielding 118 of the GPK 114 and use the spotlight to illuminate targets or the area surrounding the vehicle 100 during turret operation. The spotlight 120a may be used to illuminate a desired area. The spotlight 120a, for example, may use high intensity discharge (HID) or light emitting diode (LED) light sources, or alternative light sources such as infrared (IR) sources for providing light.

Turret operators may power the electronic accessory devices 120 at the vehicle turret 102 using power from the turret power source 110, in order to access the power at the turret power source 110, turret operators may couple the electronic accessory devices 120 to a power apparatus 104 and may couple the power apparatus to the turret power source. In this way, the electronic accessory devices 120 receive power from the turret power source 110 via the power apparatus 104. The power apparatus 104 may include circuitry such that the power apparatus provides protected power to the electronic accessory devices 120. As used in this description, protected power refers to power received along a transmission path that includes a circuit protection unit 156 (FIG. 4) or protection circuitry 161 (FIG. 5) that interrupts the transmission of power in response to detection of a fault condition (e.g., a short in the power transmission path). The power apparatus 104 may also include regulation circuitry (FIG. 5) such that the power apparatus provides regulated power to some of the accessory devices 120. As used in this description, regulated power refers to power that is stabilized against input voltage and load in order to provide a stable voltage or current.

Figure 2:
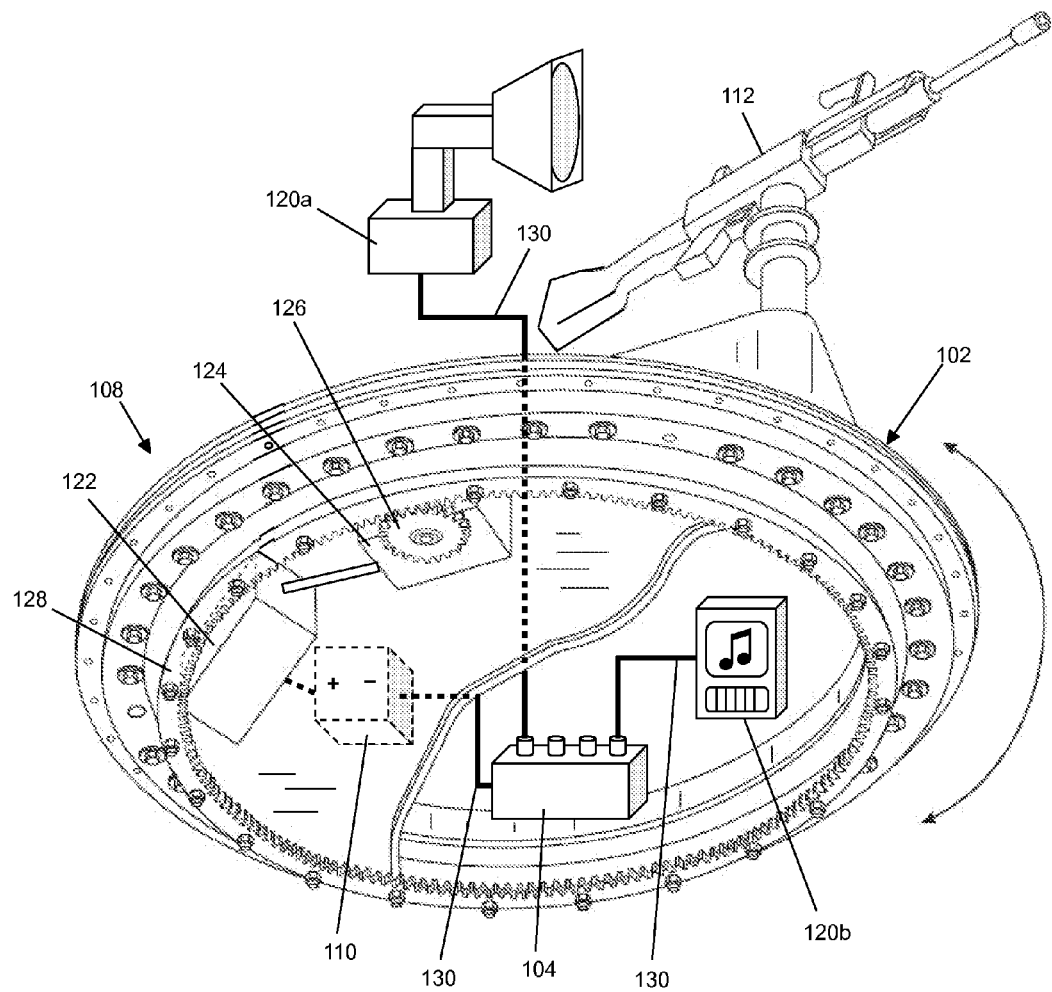
FIG. 2 is a bottom right perspective view of a rotatable turret and an example of an implementation of a power apparatus.

Referring now to FIG. 2, a bottom right perspective view of a vehicle turret 102 and an example of an implementation of a power apparatus 104 is shown. As mentioned above, a turret drive system 108 may drive rotation of the turret 102. A controller 122 mounted to the vehicle turret 102 receives input signals from an input device such as a joystick (not shown) actuated by a turret operator during turret operation. The controller 122 is coupled to a drive motor 124 and transmits control signals to the drive motor to activate the drive motor. In response to the control signals received from the controller 122, the drive motor 124 activates and spins a drive gear 126. The drive gear 126 engages a ring gear 128 that is also mounted to the vehicle turret 102. As the drive gear 126 spins, the drive motor 124 drives rotation of the vehicle turret 102. The controller 122 and the drive motor 124, in this example, are coupled to the turret power source 110, which provides the power used to operate the controller 122 and the drive motor 124.

A power apparatus 104 may be positioned at the vehicle turret 102 and coupled to the turret power source 110. Electronic devices 120 may also be positioned at the vehicle turret 102 and coupled to the power apparatus 104. As shown by way of example in FIG. 2, the electronic accessory devices 120 coupled to the power apparatus 104 include a turret spotlight 120a and a digital music player 120b. Power couplings 130 (e.g., power cables) may be used to couple the controller 122, drive motor 124, and power apparatus 104 to the turret power source 110 as well as to couple the electronic accessory devices 120 to the power apparatus.

As seen in the example shown in FIG. 2, the turret power source 110, the power apparatus 104, and the electronic accessory devices 120 are each positioned at the vehicle turret 102. Accordingly, the turret power source 110, the power apparatus 120, and the electronic accessory devices 120 all move in conjunction with the vehicle turret 102 as the turret rotates. As a result, the power couplings 130 that couple the turret power source 110, power apparatus 104, and electronic accessory devices 120 to each other also move in conjunction with the vehicle turret 102 as the turret rotates thereby avoiding entanglement of the power couplings during turret rotation.

Figure 3:
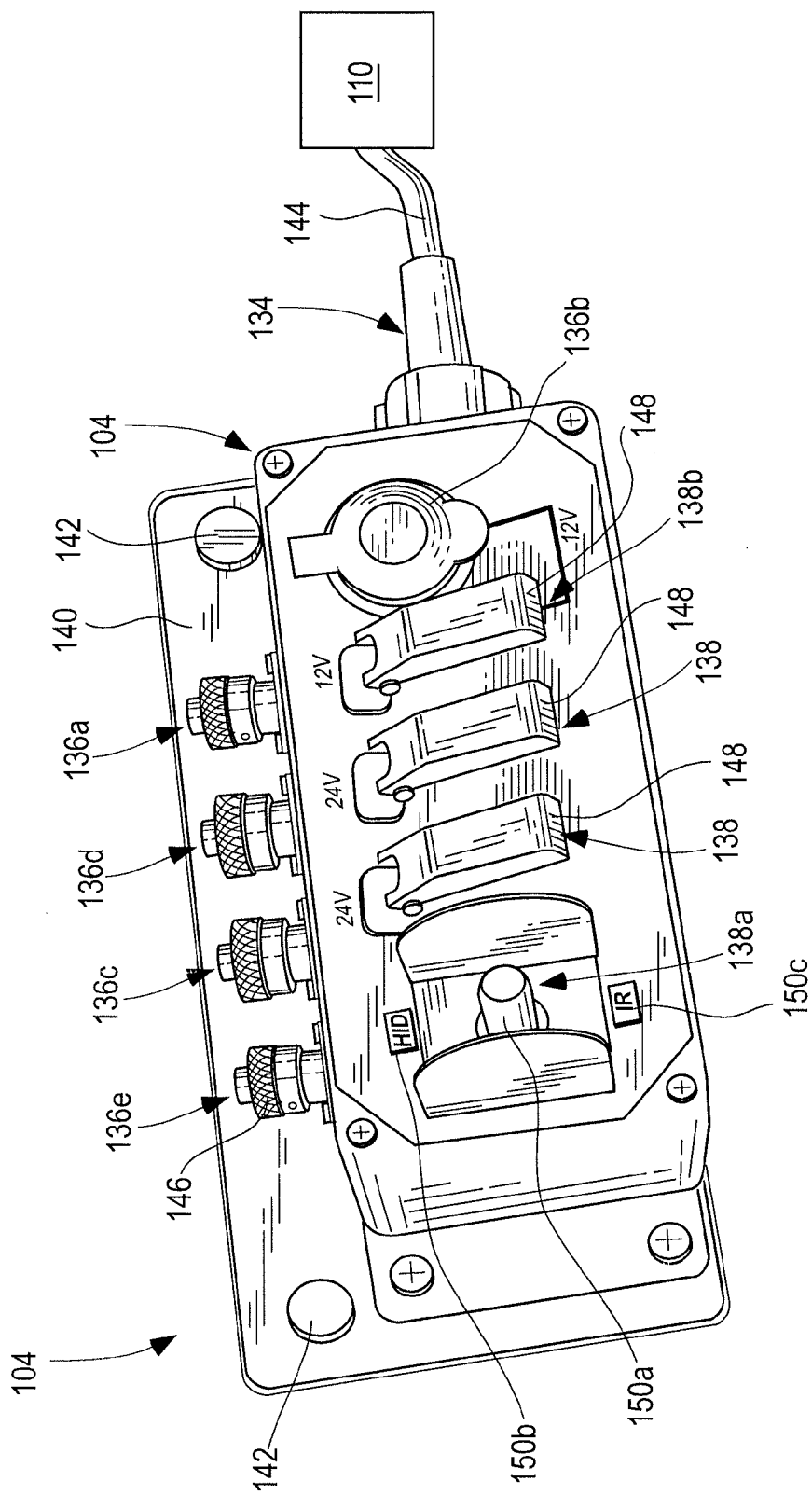
FIG. 3 is a front perspective view of an example of an implementation of a power apparatus for a vehicle turret.

Referring now to FIG. 3, an example of an implementation of a power apparatus 104 for a vehicle turret 102 is shown. As seen in FIG. 3, the power apparatus 104 includes: a power module 132 that is configured to be coupled to the turret power source 110; a coupling device 134 configured to couple the power module to the turret power source; protection circuitry (FIG. 5) at the power module that protects one or more power outlets; regulation circuitry (FIG. 5) at the power module that regulates the power received from the turret power source; and one or more power outlets 136a-136e that provide the power to an electronic accessory device 120 when the electronic accessory device is coupled to the power module. In this way, the power apparatus 104 functions as an auxiliary module of the turret power source 110 in order to provide electronic accessory devices 120 with access to the power available at the turret power source. The power apparatus 104 may also include one or more switches 138 respectively associated with each of the power outlets 136a-136e that toggle transmission of the power to the power outlets on and off in response to actuation of the switches.

As mentioned above, the power apparatus 104 may be positioned at the vehicle turret 102 such that the power apparatus moves in conjunction with the vehicle turret as the vehicle turret rotates. The power apparatus 104, in this example, may be removably mounted to the vehicle turret 102. For example, the power apparatus 104 may be mounted to an interior surface of the vehicle turret 102 so that a turret operator may access the switches of the power apparatus with relative ease. In order to mount the power apparatus 104 to the vehicle turret 102, the power apparatus may include a frame 140 that surrounds the power module 132 as shown by way of example in FIG. 3. The frame 140 may include a set of mounting screws 142 for mounting the power apparatus 104 to the vehicle turret 102. It will be understood that any type of mounting or fastening means may be employed to mount the power apparatus 104 to the vehicle turret 102. For example, the power module 132 may alternatively include a magnetic base that magnetically mounts the power module to the vehicle turret 102. Using mounting screws 142 or a magnetic base to mount the power apparatus 104 to the vehicle turret 102 advantageously allows the power apparatus to be removably mounted to the vehicle turret. As a result, the power apparatus 104 may be positioned and repositioned at the vehicle turret 102 according to the preferences of the turret operator.

The coupling device 134 couples the power module 132 to the turret power source 110 and may include a power cable 144. The coupling device 134 may be coupled to the power module 132 at a power input port (FIG. 4), and power from the turret power source 110 may be received at the power module via the coupling device and power input port. The coupling device 134 will be discussed in further detail below with reference to FIG. 4.

The power apparatus 104 may also include one or more power outlets 136. The power outlets 136a-136e may be, for example, 12 volt (V) or 24 volt power outlets. The power outlets 136a-136e may provide direct current (DC) to the electronic accessory devices 120 respectively coupled to the power outlets. Accordingly, the power outlets 136a-136e may be, for example, 12 VDC power outlets or 24 VDC power outlets. The power outlets 136a-136e may also provide alternating current (AC). For example, the power outlets 136a-136e may also be 1.20 VAC or 240 VAC power outlets. The power apparatus 104 may include multiple power outlets 136a-136e for providing power to multiple electronic accessory devices 120 respectively coupled to the power outlets. It will be understood that the multiple power outlets 136a-136e may be any combination of DC or AC power outlets providing any combination of voltages.

In the example power apparatus 104 shown in FIG. 3, the power apparatus includes two 12 VDC power outlets 136a and 136b and two 24 VDC power outlets 136c and 136d. The two 24 VDC power outlets 136c and 136d and one of the 12 VDC power outlets 136a, in this example, are circular 4-pin electrical connectors with circular bayonet-type covers 146. The power outlets 136a, 136c, and 136d, in this example, may alternatively be circular 2-pin electrical connectors with circular bayonet-type covers 146. Additionally, one of the 12 VDC power outlets 136b is a cigarette lighter-style socket (i.e., cigarette or cigar lighter receptacle) commonly found in automobiles used to provide power via a corresponding cigarette (or cigar) lighter-style plug. In an alternative example, the power outlet 136b may be a 5 VDC USB port (Universal Serial Bus). As discussed further below in FIG. 5, regulation circuitry 162 may provide regulated power to power outlet 136b. The example power apparatus 104 shown in FIG. 3 also includes a dedicated power outlet 136e. The dedicated power outlet 136e may be dedicated to providing power to a particular electronic accessory device 120. For example, the dedicated power outlet 136e may be dedicated to a turret spotlight 120a mounted to the vehicle turret 102. Accordingly, the dedicated power outlet 136e, in this example, may be a 24 VDC power outlet that provides protected power to the turret spotlight 120a. It will be understood that the power apparatus 104 may include an alternative number of power outlets 136 and additional or alternative types of power outlets.

The power outlets 136 may be respectively associated with and coupled to a set of switches 138 that toggle transmission of the power to the power outlets in response to actuation of the switches. Accordingly, when a switch 138 is in an activated position, the power is transmitted to an electronic accessory device 120 coupled to the power outlet 136 associated with the switch; and when the switch is in a deactivated position, the power is not transmitted thereby preventing draining of current from the turret power source 110. Additionally, the power module 132 may be implemented such that the batteries 150 of turret power source 110 will not be drained even if no load is connected to the power outlets 136, and even if a switch 138 is in an activated position with no load connected to the power outlets 136. The power module 132 also protects the electronic accessory device 120 against voltage spikes from the turret power source 110. The power apparatus 104 may also include protective switch guards 148 that respectively cover the switches 138 when the switches are in a deactivated position. Accordingly, the switches 138 may be referred to as gloveable protected switches.

The power apparatus 104 shown in FIG. 3 also includes a spotlight switch 138a coupled to the dedicated power outlet 136e for the turret spotlight 120a. The turret spotlight 120a may be adapted to discharge different types of light. For example, visible light such as light from an LED or high intensity discharge (HID) light source may be discharged as well as infrared (IR) light discharged from the turret spot light. Accordingly, the spotlight switch 138a may toggle between a deactivated position 150a and one of two spotlight settings—a visible white light setting 150b and an IR setting 150c—as shown by way of example in FIG. 3. In an alternative example, the switch that activates and deactivates the spotlight may reside at the spotlight itself, and the switch 138a may simple toggle transmission of power to the dedicated power outlet 136e. In this alternative example, the switch at the spotlight may only activate the spotlight when the switch 138a is in an activated position such that power is transmitted to the dedicated power outlet 136e. If the switch 138a is in a deactivated position such that power is not provided at the dedicated power outlet 136; then actuating the switch at the spotlight would not activate the spotlight.

Figure 4:
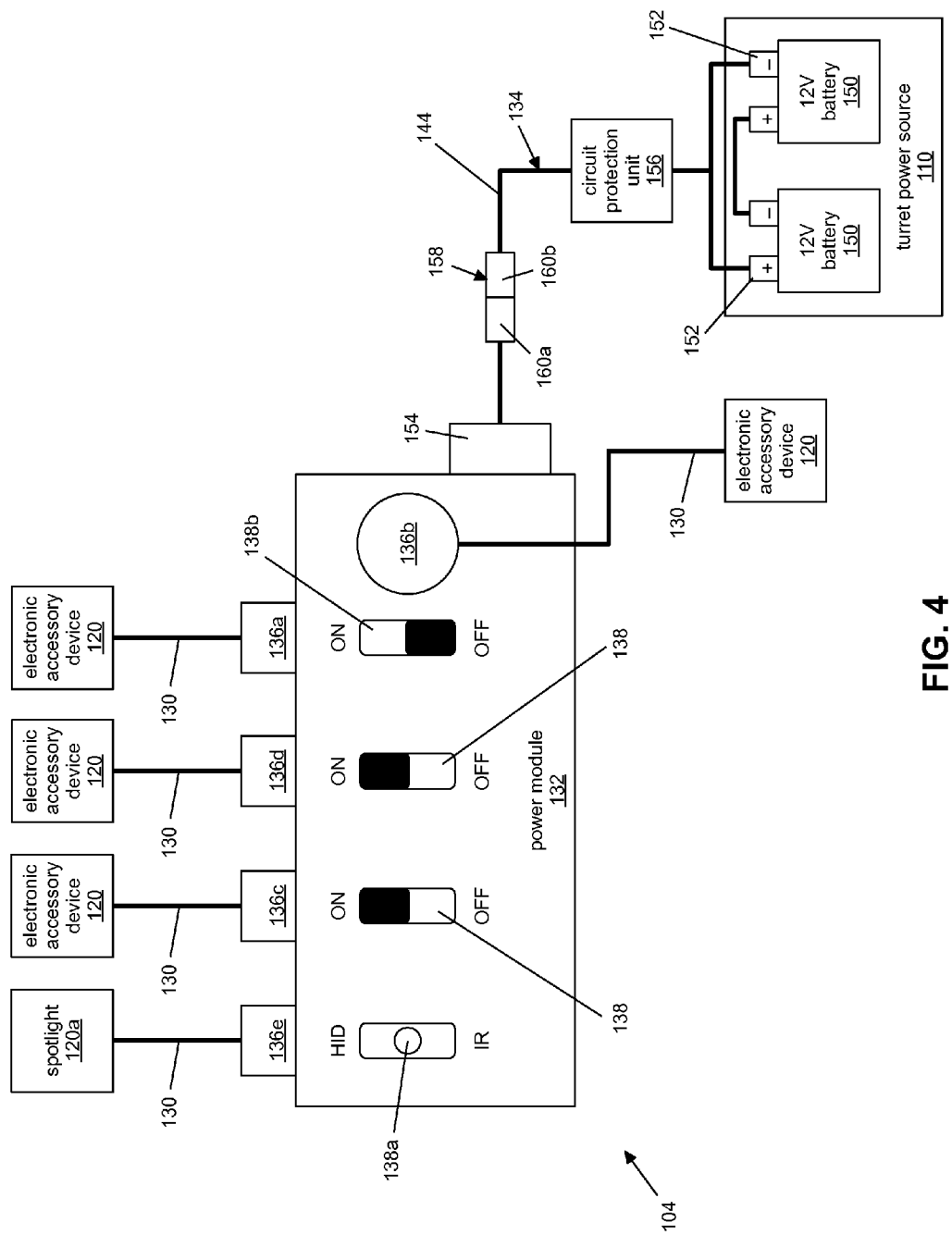
FIG. 4 is a block diagram of the power apparatus of FIG. 3.

Referring now to FIG. 4, a block diagram of the power apparatus 104 of FIG. 3 is shown. The power apparatus 104 in FIG. 4 is shown to be coupled to the turret spotlight 120a via the dedicated power outlet 136e and multiple electronic accessory devices 120 via the 24V power outlets 136c and 136d and the 12V power outlets 136a and 136b. Additionally, the switches 138 for the 24V power outlets 136c and 136d are shown in the deactivated (i.e., off) position, and the switch 138b for the 12V power outlets 136a and 136b is shown to be in the activated (i.e., on) position.

The power apparatus 104 in FIG. 4 is also shown to be coupled to the turret power source 110 via the coupling device 134. The turret power source 110, in this example, is a 24V turret power source that includes two 12V power sources 150 (e.g., two 12V batteries). The coupling device 134 couples to the terminals 152 of the batteries 150 and the power input port 154 of the power apparatus 104. Accordingly, the coupling device 134 may include a power cable 144 that functions as the power transmission path between the turret power source 110 and the power apparatus 104.

As mentioned above, the power received at the electronic accessory devices 120 is protected. To provide protected power, the coupling device 134 may include a circuit protection unit 156 that interrupts the transmission of power from the turret power source 110 in response to detection of a fault condition. The circuit protection unit 156 also protects against resistive (or soft) shorts if an electronic accessory device 120 requests too much current. The circuit protection unit 156 may be, for example, a circuit breaker. Additionally, the circuit protection unit 156 may be positioned along the power cable 144 between the turret power source 110 and the power module 132.

The coupling device 134 may also include a latching connector 158 along the power cable 144. The latching connector 158 may include a pair of corresponding connection ends 160a and 160b designed to releasably latch together. For example, the latching connector 158 may include a tab (not shown) that must be depressed to disconnect the connection ends. When connecting the connection ends 160*a* and 160*b*, the tab of the latching connector 158, in this example, may engage so as to prevent disconnection of the latching connector. The latching connector 158 allows the power apparatus 104 to be positioned and repositioned at the vehicle turret 102 with relative ease. The coupling device 134 may remain coupled to the turret power source 110, and the power module 104 may be disconnected from the turret power source at the latching connector 158. Accordingly, the part of the coupling device 134 having the second connection end 160*b* remains attached to the turret power source 110 and the part of the coupling device having the first connection end 160*a* remains attached to the power module 132 while the power module is repositioned at a desired location at the vehicle turret 102. Once the power module 132 has been repositioned, the first connection end 160*a* and the second connection end 160*b* of the latching connector 158 may be reconnected in order to re-couple the power module to the turret power source 110. In this way, the potentially cumbersome process of disconnecting and reconnecting the coupling device 134 at the turret power source 110 may advantageously be avoided.

Figure 5:
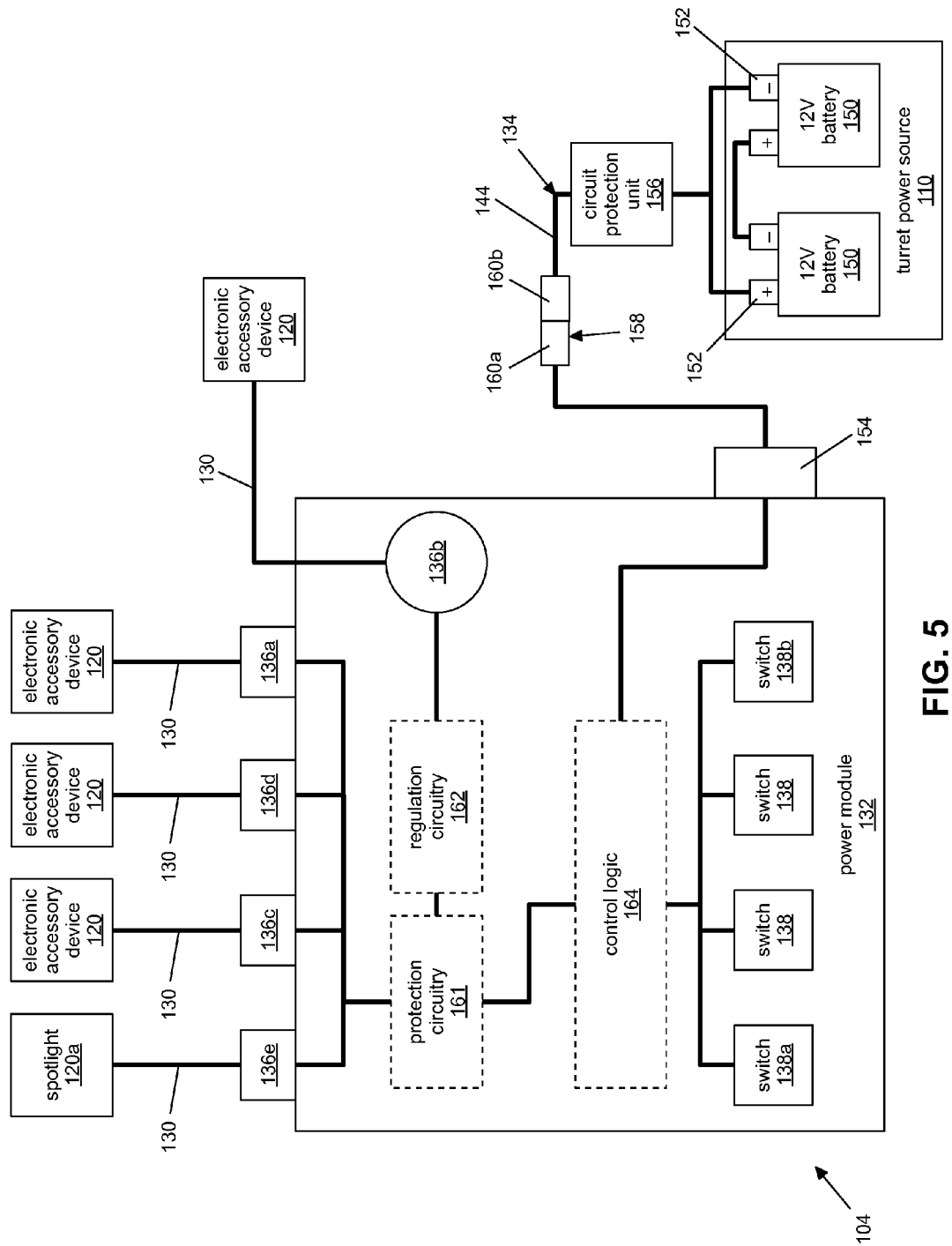
FIG. 5 is another block diagram of the power apparatus of FIG. 3.

Referring now to FIG. 5, another block diagram of the power apparatus 104 of FIG. 3 is shown. In FIG. 5, internal components of the power apparatus 104, in this example, are shown including: protection circuitry 161 that protects the power outlets 136*a*-436*e*; regulation circuitry 162 that regulates the power provided to power outlet 136*b*; and control logic 164 that controls operation of the power outlets 136*a*-136*e*.

The protection circuitry 161 functions like the circuit protection unit 156 discussed above by interrupting the transmission of power from the turret power source 110 to the power outlets 136*a*-136*e*. The regulation circuitry 162, in this example, regulates the power received from the turret power source 110 in order to obtain regulated power provided to an electronic accessory device 120 coupled to the power outlet 136*b* of the power apparatus 104. Accordingly, the regulation circuitry 162 is coupled to the protection circuitry 161 and the power outlet 136*b*.

The power apparatus 104 may also be configured to detect situations where one of the switches 138 is in an activated position (i.e., on) but no electronic accessory device 120 is coupled to the corresponding power outlet 136 associated with the switch. The control logic 164 is configured to detect when a load appears at one of the power outlets 136*a*-136*e* and is configured to activate the power outlets in response to detecting a load. The control logic 164 is also configured to detect when a load is removed from one of the power outlets 136*a*-436*e* and deactivate the power outlets in response in order to prevent draining current from the turret power source 110. Accordingly, the control logic 164 may be coupled to the power outlets 136*a*-136*e* and corresponding switches 138. The control logic 164 may monitor the switches 138 and the corresponding power outlets 136*a*-136*e*. If the control logic 164 determines that a switch 138 is on and determines that the corresponding power outlet 136 is not coupled to an electronic accessory device 120, then the control logic may disable the power outlet to prevent draining current from the turret power source 110. In other words, the control logic 164 disables a power outlet 136 in response to a determination that the switch 138 for the power outlet is in an activated position and that no load is present at the power outlet. When the control logic 164 disables a power outlet 136, transmission of the power to the power outlet is disabled. In this way, the power apparatus 104 may advantageously minimize the drain of current from the turret power source (e.g., less than 100 microamps) when a switch 138 is in a deactivated position or an electronic accessory device 120 is not coupled to one of the power outlets 136*a*-136*e*.

The control logic 164 may also disable the power outlets 136*a*-136*e* of the power apparatus 104 according to a predetermined priority in response to a determination that the turret power source 110 has dropped below a predetermined power threshold such as for example, a voltage threshold. The voltage threshold may be selected to prevent the voltage of the turret power source 110 from dropping below a level that can be damaging to the batteries 150 of the turret power source. For example, if the turret power source 110 drops below a voltage threshold of around 19V, then the control logic 164 may disable the power outlets 136*a*-136*e*. Accordingly, the control logic 164 may be coupled to the power input port 154 to monitor the turret power source 110.

If the control logic 164 determines that the turret power source 110 drops below the power threshold, then the control logic 164 may disable the power outlets 136 according to a predetermined priority such as, for example: i) the 12V cigarette lighter-style power outlet 136*b*; ii) one of the 24V power outlets 136*c* or 136*d*; iii) the other 24V power outlet 136*c* or 136*d*; iv) the other 12V power outlet 136*a*; and v) the dedicated power outlet 136*e* for the turret spotlight 120*a*. The control logic 164 may disable one of the power outlets 136 according to the predetermined priority. Upon disabling one of the power outlets 136, the control logic 164 may determine whether an additional power outlet 136 should be disabled based on the power threshold and the power available at the turret power source 110. If the control logic 164 determines that an additional power outlet 136 should be disabled, then the control logic may disable the next power outlet of the predetermined priority. This step may be repeated until all power outlets 136 are disabled or until the control logic 164 determines that the turret power source 110 is no longer below the power threshold. If the control logic 164 determines that the turret power source 110 is no longer below the power threshold, then the control logic may reactivate any disabled power outlets 136 also according to the predetermined priority. In other words, the last power outlet 136 to be disabled may be the first power outlet that is re-enabled. The control logic 164 may determine that a disabled power outlet 136 may be re-enabled when the turret power source 110 has enough power to drive the rotation of the turret 102 and to also power the electronic accessory device 120 coupled to the disabled power outlet. In this way, the power apparatus 104 may advantageously ensure that enough power remains at the turret power source 110 to drive rotation of the turret 102 when needed.

Figure 6:
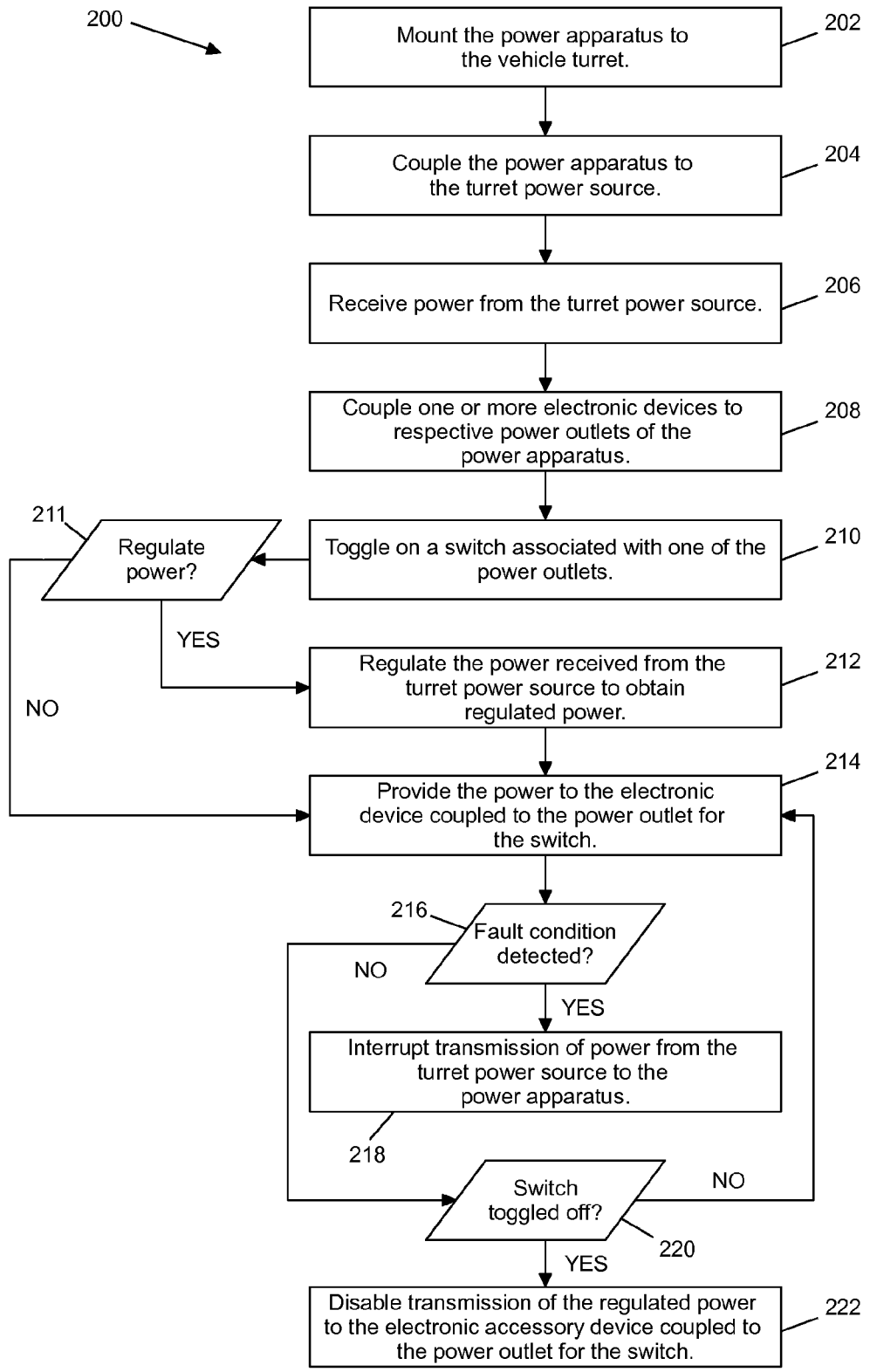
FIG. 6 is a flowchart of example method steps for providing power to an electronic device at a vehicle turret with a power apparatus.

Referring to FIG. 6, a flowchart 200 of example method steps for providing power to an electronic device at a vehicle turret with a power apparatus is shown. A user (e.g., a turret operator or technician) may mount a power apparatus to a vehicle turret (step 202). The user may then couple the power apparatus to the turret power source (step 204). Once the power apparatus is coupled to the turret power source, the power apparatus may receive power from the turret power source (step 206).

A user may then couple one or more electronic accessory devices to respective power outlets of the power apparatus (step 208). The user may then toggle on a switch associated with one of the power outlets (step 210). If the power for the power outlet should be regulated (step 211), then the power apparatus may regulate the power received from the turret power source to obtain regulated power (step 212). The power apparatus may provide the power to the electronic device coupled to the power outlet for the activated switch (step 214).

If a fault is detected as the power apparatus provides the power to the electronic device (step 216), the transmission of power from the turret power source to the power apparatus may be interrupted (step 218). The protection circuitry may be automatically reset when the fault condition is removed and no longer detected. If no faults are detected, the power apparatus may provide the power to the electronic accessory device (step 214) until the switch for the power outlet is toggled off. If the user toggles off the switch for the power outlet (step 220), the power apparatus may disable the transmission of the power to the electronic accessory device coupled to the power outlet for the deactivated switch (step 222).

Figure 7:
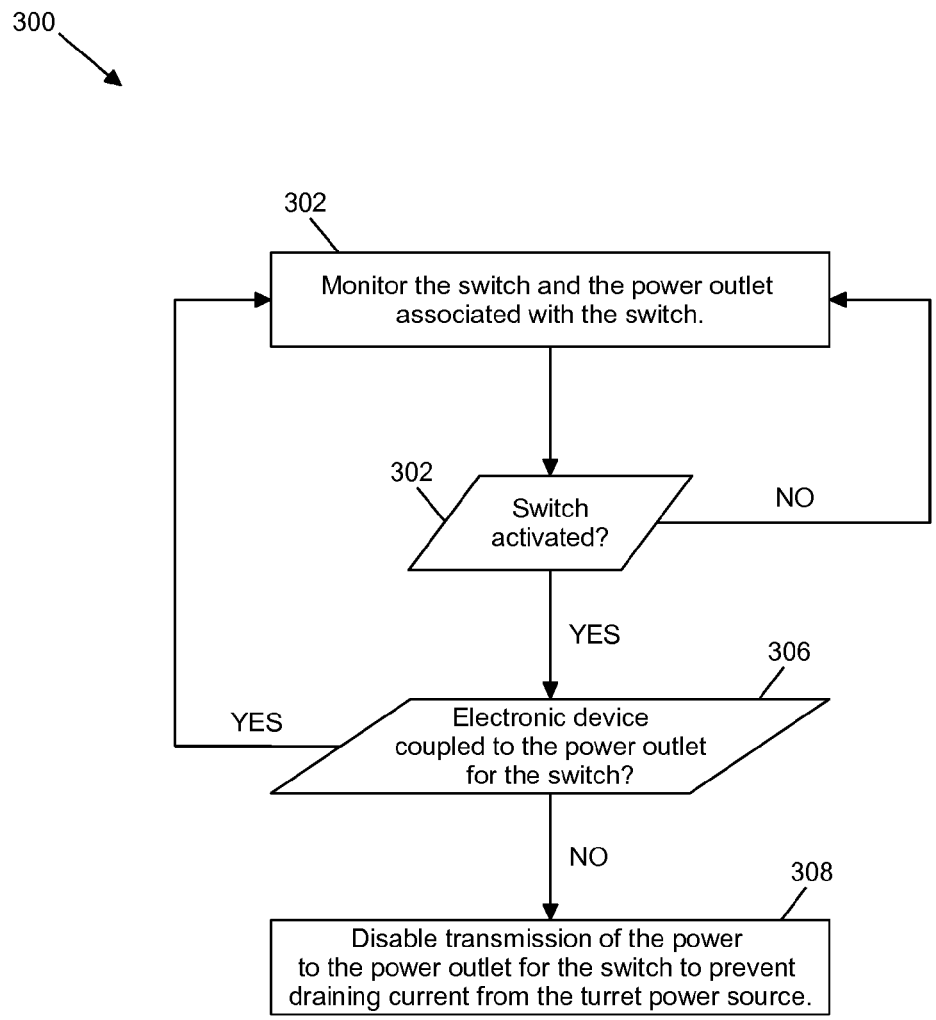
FIG. 7 is a flowchart of example method steps for monitoring the switches and power outlets of a power apparatus for a vehicle turret.

As discussed above, the power apparatus may monitor the switches and power outlets, and the power apparatus may selectively disable the power outlets to prevent drain on the turret power source in certain circumstances. With reference to FIG. 7, a flowchart 300 of example method steps for monitoring the switches and power outlets of a power apparatus for a vehicle turret is shown. The power apparatus may include control logic that monitors the switches and the power outlets for the switches of the power apparatus (step 302). The control logic may determine whether a switch is activated (step 304) and whether an electronic device is coupled to an activated switch (step 306). If the control logic determines that a switch is activated (step 304) and that no electronic device is coupled to the activated switch (step 306), then the control logic may disable transmission of the power to the power outlet for the activated switch (step 308). In this way, the control logic prevents draining current from the turret power source by disabling an active power outlet where no load is present.

Figure 8:
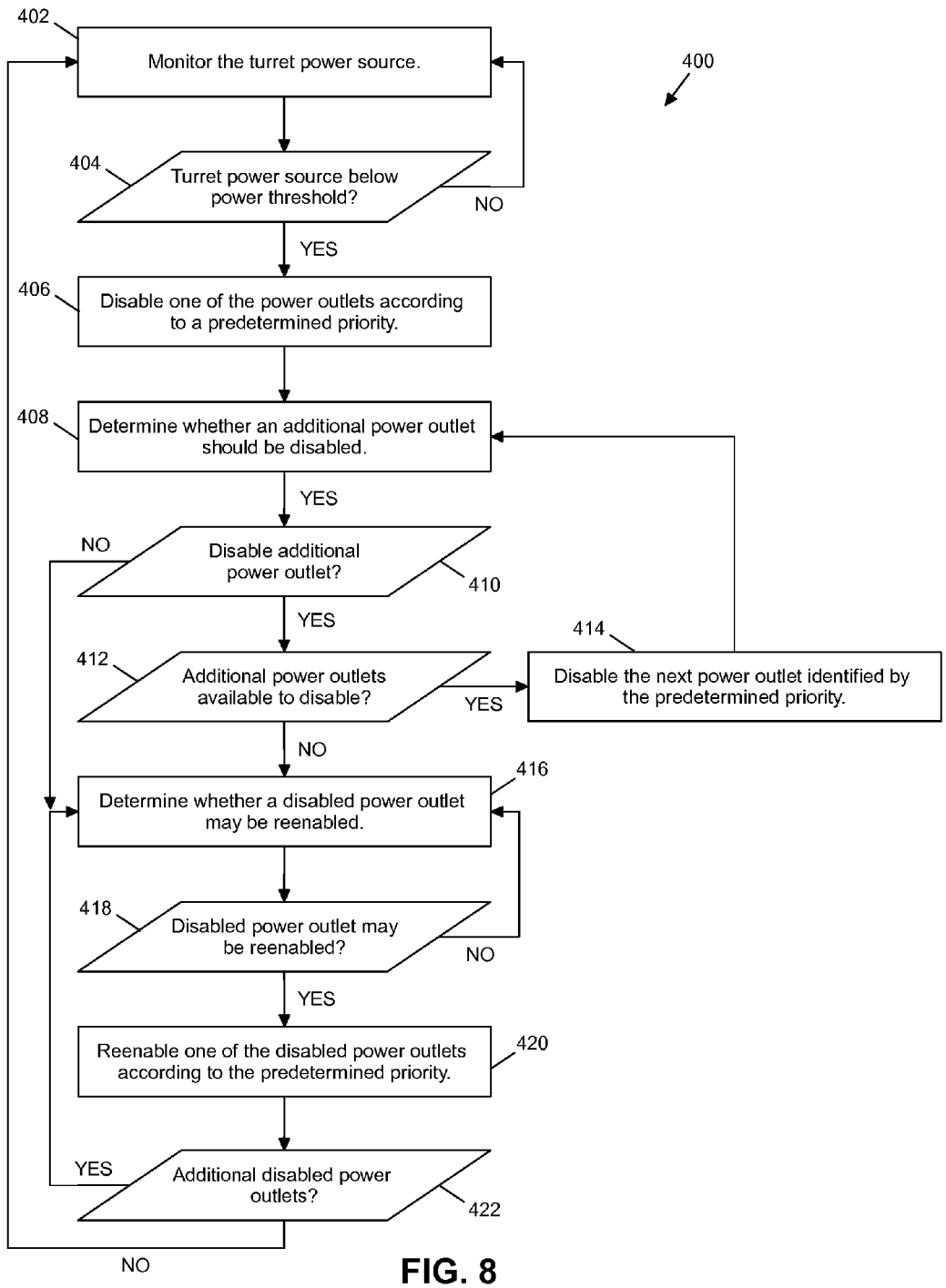
FIG. 8 is a flowchart of example method steps for monitoring the turret power source with a power apparatus for a vehicle turret.

Also discussed above, the power apparatus monitor the turret power source, and the power apparatus may selectively disable one or more power outlets according to a predetermined priority when the turret power source drops below a predetermined power threshold. Referring now to FIG. 8, a flowchart 400 of example method steps for monitoring the turret power source with a power apparatus for a vehicle turret is shown. Control logic at the power apparatus may monitor the turret power source (step 402). If the turret power source drops below a predetermined power threshold (step 404), then the control logic may disable one of the power outlets according to a predetermined priority (step 406) as explained above with reference to FIG. 5.

In some circumstances, the control logic may determine that additional power outlets should be disabled (step 408). If the control logic determines that additional power outlets should be disabled (step 410) and there are additional active power outlets that are available to disable (step 412), the control logic may disable the next power outlet identified by the predetermined priority (step 414).

Once all the power outlets have been disabled and there are no more power outlets to disable, the control logic may determine whether a disabled power outlet should be re-enabled (step 416). The control logic may determine that a disabled power outlet may be re-enabled when, for example, the turret power source is no longer below the power threshold. If the control logic determines that one of the disabled power outlets may be re-enabled (step 418), the control logic may re-enable one of the disabled power outlets (step 420) according to the predetermined threshold (e.g., the last disabled power outlet may be the first re-enabled power outlet). If there are additional disabled power outlets (step 422), the control logic may again determine whether any of the additional disabled power outlets may be re-enabled (step 416). If there are no more disabled power outlets (step 422), i.e., if all of the power outlets have been re-enabled, the control logic may continue to monitor the turret power source (step 402) to determine if the turret power source drops below a predetermined power threshold (step 404).

Figure 9:
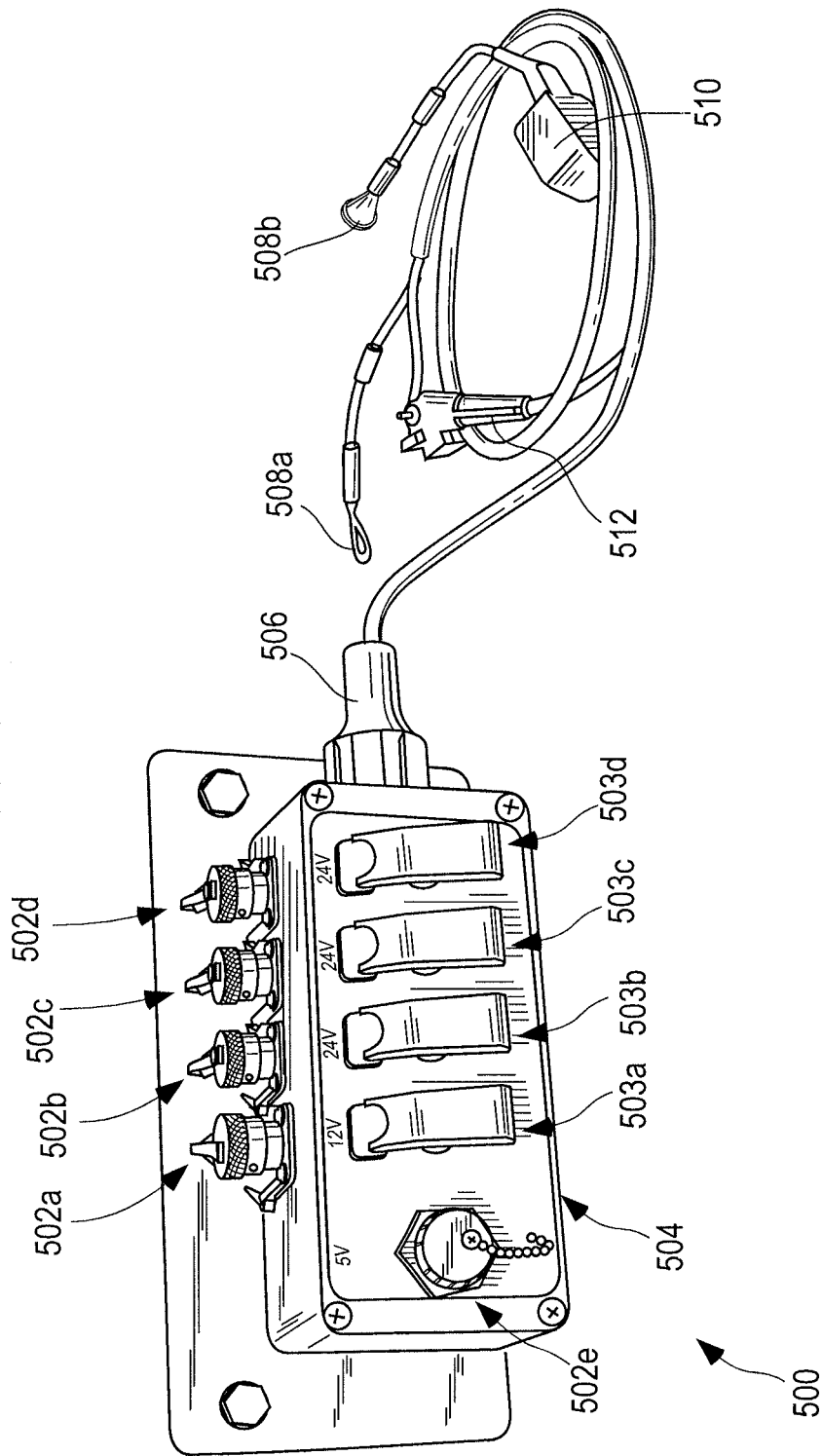
FIG. 9 is a front perspective view of an example of an alternative implementation of a power apparatus for a vehicle turret.

Referring to FIG. 9, a front perspective view of an example of an alternative implementation of a power apparatus 500 for a vehicle turret is shown. The power apparatus 500, in this example, includes an alternative set of power outlets 502. In this example, the power apparatus includes one 12 VDC power outlet 502a; three 24 VDC power outlets 502b, 502c, and 502d; and one 5 VDC USE port 502e. Each of the power outlets 502a-d is coupled to a corresponding switch 503a-d for enabling and disabling transmission of power from the turret power source 110 to the respective power outlets. Like the example power apparatus 104 shown in FIG. 3, the example power apparatus shown in FIG. 9 includes a power module 504 that is configured to be coupled to the turret power source 110 (FIG. 1) and a coupling device 506 configured to couple the power module to the turret power source. The coupling device 506, in this example, includes a pair of leads 508a and 508h used to connect the coupling device to the terminals of the turret power source 110. As mentioned above and as shown by way of example in FIG. 9, the coupling device may also include a circuit protection unit 510 and a latching connector 512 to separate the coupling device. As mentioned previously, the power apparatus 500 may include more or less power outlets as well as or alternative types of power outlets.

It will be understood and appreciated that one or more of the processes, sub-processes, and process steps described in connection with FIGS. 5-8 may be performed by hardware, software, or a combination of hardware and software on one or more electronic or digitally-controlled devices. The software may reside in a software memory (not shown) in a suitable electronic processing component or system such as, for example, one or more of the functional systems, devices, components, modules, or sub modules schematically depicted in FIGS. 5-8. The software memory may include an ordered listing of executable instructions for implementing logical functions (that is, "logic" that may be implemented in digital form such as digital circuitry or source code, or in analog form such as analog source such as an analog electrical, sound, or video signal). The instructions may be executed within a processing module (e.g., the control logic of FIG. 5), which includes, for example, one or more microprocessors, general purpose processors, combinations of processors, digital signal processors (DSPs), field programmable gate arrays (FPGAs), or application-specific integrated circuits (ASICs). Further, the schematic diagrams describe a logical division of functions having physical (hardware and/or software) implementations that are not limited by architecture or the physical layout of the functions. The example systems described in this application may be implemented in a variety of configurations and operate as hardware/software components in a single hardware/software unit, or in separate hardware/software units.

The executable instructions may be implemented as a computer program product having instructions stored therein which, when executed by a processing module of an electronic system (e.g., the control of FIG. 5), direct the electronic system to carry out the instructions. The computer program product may be selectively embodied in any non-transitory computer-readable storage medium for use by or in connection with an instruction execution system, apparatus, or device, such as a electronic computer-based system, processor-containing system, or other system that may selectively fetch the instructions from the instruction execution system, apparatus, or device and execute the instructions. In the context of this document, computer-readable storage medium is any non-transitory means that may store the program for use by or in connection with the instruction execution system, apparatus, or device. The non-transitory computer-readable storage medium may selectively be, for example, an electronic, magnetic, optical, electromagnetic, infrared, or semiconductor system, apparatus, or device. A non-exhaustive list of more specific examples of non-transitory computer readable media include; an electrical connection having one or more wires (electronic); a portable computer diskette (magnetic); a random access, i.e., volatile, memory (electronic); a read-only memory (electronic); an erasable programmable read only memory such as, for example, Flash memory (electronic); a compact disc memory such as, for example, CD-ROM, CD-R, CD-RW (optical); and digital versatile disc memory, i.e., DVD (optical). Note that the non-transitory computer-readable storage medium may even be paper or another suitable medium upon which the program is printed, as the program can be electronically captured via, for instance, optical scanning of the paper or other medium, then compiled, interpreted, or otherwise processed in a suitable manner if necessary, and then stored in a computer memory or machine memory.

It will also be understood that the term "coupled" as used in this document means that two or more systems, devices, components, modules, or sub-modules are capable of communicating with each other via signals that travel over some type of signal path. The signals may be communication, power, data, or energy signals, which may communicate information, power, or energy from a first system, device, component, module, or sub-module to a second system, device, component, module, or sub-module along a signal path between the first and second system, device, component, module, or sub-module. The signal paths may include physical, electrical, magnetic, electromagnetic, electrochemical, optical, wired, or wireless connections. The signal paths may also include additional systems, devices, components, modules, or sub-modules between the first and second system, device, component, module, or sub-module.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. An apparatus for providing power at a vehicle turret wherein the vehicle turret is powered by a turret power source that rotates in conjunction with the vehicle turret, the apparatus comprising:
    a power module configured to be coupled to the turret power source such that the power module receives power from the turret power source when the power module is coupled to the turret power source;
    a coupling device configured to couple the power module to the turret power source such that the power module receives power from the turret power source via the coupling device when the power module is coupled to the turret power source;
    one or more power outlets configured to provide power to an electronic device when the electronic device is coupled to one of the power outlets;
    wherein the power module and coupling device rotate in conjunction with the vehicle turret when the vehicle turret rotates.

2. The apparatus of claim 1 wherein the power module functions as an auxiliary module of the turret power source in order to provide one or more electronic devices with access to the power available at the turret power source.

3. The apparatus of claim 1 further comprising protection circuitry at the power module, the protection circuitry is coupled to at least one of the power outlets and interrupts transmission of the power received from the turret power source in response to detection of a fault condition.

4. The apparatus of claim 3 wherein the protective circuitry is automatically reset when the fault condition is removed.

5. The apparatus of claim 2 wherein the power module protects the electronic device against voltage spikes from the turret power source.

6. The apparatus of claim 1 further comprising regulation circuitry at the power module, the regulation circuitry is coupled to at least one of the power outlets and regulates the power received from the turret power source.

7. The apparatus of claim 1 further comprising a circuit protection unit that interrupts transmission of the power received from the turret power source in response to detection of a fault condition.

8. The apparatus of claim 7 wherein:
    the coupling device includes a power cable; and
    the circuit protection unit is positioned along the power cable between the power module and the turret power source.

9. The apparatus of claim 1 wherein the power module is removably mountable to the vehicle turret such that the power module is repositionable at the vehicle turret.

10. The apparatus of claim 9 wherein the power module is removably mountable to an interior surface of the vehicle turret.

11. The apparatus of claim 9 further comprising a frame that mounts the power module to the vehicle turret.

12. The apparatus of claim 1 further comprising a plurality of power outlets such that individual electronic devices respectively receive the power received from the turret power source via individual power outlets of the plurality of power outlets when the individual electronic devices are respectively coupled to the individual power outlets.

13. The apparatus of claim 12 wherein at least one of the power outlets is selected from the group consisting of:
    (a) USB port;
    (b) a 12 volt direct current power outlet; and
    (c) an alternating current power outlet.

14. The apparatus of claim 12 wherein the plurality of power outlets include:
    two 12 volt direct current power outlets;
    two 24 volt direct current power outlets; and
    one 5 volt direct current USB port.

15. The apparatus of claim 14 further comprising a dedicated power outlet that provides the power to a turret spotlight when the turret spotlight is coupled to the dedicated power outlet.

16. The apparatus of claim 1 wherein one of the power outlets is a dedicated power outlet that provides the power to a turret spotlight when the turret spotlight is coupled to the dedicated power outlet.

17. The apparatus of claim 16 further comprising a switch coupled to the dedicated power outlet, the switch toggles, at least in part, between a first spotlight setting and a second spotlight setting.

18. The apparatus of claim 17 wherein:
    the first spotlight setting is a visible light setting; and
    the second setting is an infrared (IR) setting.

19. The apparatus of claim 1 further comprising one or more switches respectively coupled to individual power outlets of the one or more power outlets, the one or more switches toggle transmission of the power to the individual power outlets.

20. The apparatus of claim 19 wherein individual switches of the one or more switches include a protective switch guard, the protective switch guard is configured to cover the individual switch when the individual switch is in a deactivated position.

21. The apparatus of claim 1 wherein transmission of the power to one of the power outlets is disabled in response to a determination that a switch coupled to the power outlet is in a deactivated position such that drain of current from the turret power source is minimized.

22. The apparatus of claim 1 wherein transmission of the power to one of the power outlets is disabled in response to a determination that the power outlet is not coupled to the electronic device such that drain of current from the turret power source is minimized.

23. The apparatus of claim 1 wherein:
the power module includes a plurality of power outlets; and
transmission of the regulated power to individual power outlets of the plurality of power outlets is respectively disabled according to a predetermined priority in response to a determination that the turret power source has dropped below a predetermined power threshold.

24. The apparatus of claim 1 wherein the predetermined power threshold is a voltage threshold.

\* \* \* \* \*